(12) United States Patent
Ribarich

(10) Patent No.: US 8,488,353 B2
(45) Date of Patent: *Jul. 16, 2013

(54) CONTROL INTEGRATED CIRCUIT WITH COMBINED OUTPUT AND INPUT

(75) Inventor: Thomas Ribarich, Laguna Beach, CA (US)

(73) Assignee: International Rectifier Corporation, El Segundo, CA (US)

( * ) Notice: Subject to any disclaimer, the term of this patent is extended or adjusted under 35 U.S.C. 154(b) by 904 days.

This patent is subject to a terminal disclaimer.

(21) Appl. No.: 12/262,920

(22) Filed: Oct. 31, 2008

(65) Prior Publication Data

US 2009/0108829 A1 Apr. 30, 2009

Related U.S. Application Data

(60) Provisional application No. 60/984,247, filed on Oct. 31, 2007.

(51) Int. Cl.
*H02M 7/5387* (2007.01)
*H05B 41/36* (2006.01)
*H02M 7/523* (2006.01)

(52) U.S. Cl.
USPC .......... 363/98; 315/308; 323/285; 363/21.02; 363/147

(58) Field of Classification Search
USPC .............. 323/284, 285; 363/17, 21.02, 21.03, 363/98, 132, 147; 315/224, 307, 308
See application file for complete search history.

(56) References Cited

U.S. PATENT DOCUMENTS

| | | | |
|---|---|---|---|
| 6,775,164 B2 * | 8/2004 | Wong et al. | 363/147 |
| 7,656,102 B2 * | 2/2010 | Muramatsu et al. | 315/308 |
| 7,746,043 B2 * | 6/2010 | Melanson | 323/224 |
| 7,919,952 B1 * | 4/2011 | Fahrenbruch | 323/222 |
| 2004/0113570 A1 * | 6/2004 | Ribarich et al. | 315/307 |
| 2008/0043495 A1 * | 2/2008 | Jungreis | 363/17 |
| 2009/0066404 A1 * | 3/2009 | Heppenstall et al. | 327/513 |

* cited by examiner

*Primary Examiner* — Adolf Berhane
*Assistant Examiner* — Fred E Finch, III
(74) *Attorney, Agent, or Firm* — Farjami & Farjami LLP

(57) ABSTRACT

A control circuit for a voltage converter including a power switch for providing power to a load in accordance with an embodiment of the present application includes a driver circuit operable to provide a first control signal to the power switch to turn the power switch on and off such that a desired voltage is provided to the load, an output terminal connected to the driver circuit and operable to connect the driver circuit to the power switch; and a controller operable to control the driver circuit. The output terminal operates as an input terminal to receive external data under predetermined conditions, and the controller controls the driver circuit based on the external data.

20 Claims, 2 Drawing Sheets

CONTROL INTEGRATED CIRCUIT WITH COMBINED OUTPUT AND INPUT

CROSS-REFERENCE TO RELATED APPLICATIONS

The present application claims benefit of and priority to U.S. Provisional Patent Application Ser. No. 60/984,247 filed Oct. 31, 2007 entitled GATE DRIVER CIRCUIT ALSO USED AS AN INPUT CIRCUIT, the entire content of which is hereby incorporated by reference herein.

BACKGROUND OF THE INVENTION

1. Field of the Disclosure

The present invention relates to a control integrated circuit for use with a power converter such as an electronic ballast or voltage converter including a gate driver circuit output pin that is also used as an input for various sensing parameters.

2. Related Art

Typical power converters or electronic ballasts that include a totem-pole half-bridge circuit include various sensing circuits as well. These sensing circuits may be used to provide current sensing, programming input or to receive other external information. Each of these sensing or programming circuits usually require a separate and independent input connection. Thus, if the complete circuit is implemented as an integrated circuit (IC), each input connection requires a pin on the IC package to electrically connect the external signal being sensed to the internal integrated circuit. The need for all of these pins results in a large package size and will increase the cost of the IC.

Thus, it would be advantageous to provide a control circuit for a power converter or electronic ballast that avoids these problems.

SUMMARY OF THE INVENTION

It is an object of the present invention to provide a control integrated circuit for a power converter circuit, such as an electronic ballast or voltage converter that includes a gate driver circuit that is used to control at least one power switch where the output pin for the gate driver circuit is also used as an input pin for external data under certain conditions.

A control circuit for a power converter including a power switch for providing power to a load in accordance with an embodiment of the present application includes a driver circuit operable to provide a first control signal to the power switch to turn the power switch on and off such that a desired voltage is provided to the load, an output terminal connected to the driver circuit and operable to connect the driver circuit to the power switch and a controller operable to control the driver circuit. The output terminal operates as an input terminal to receive external data under predetermined conditions, and the controller controls the driver circuit based on the external data.

A control circuit of an electronic ballast that includes a half-bridge with a high side switch and a low side switch connected in series to provide a desired voltage at a node positioned between the high side and low side switches to a lamp in accordance with an embodiment of the present application includes a first driver circuit operable to provide a first control signal to the high side switch to turn the high side switch on and off with a first output terminal operable to connect the first driver circuit to the high side switch, a second driver circuit operable to provide a second control signal to the low side switch to turn the low side switch on and off with a second output terminal operable to connect the second driver circuit to the low side switch, a controller connected to the first driver circuit and the second driver circuit and operable to control the first and second driver circuits such that the desired voltage is provided at the node between the high side and low side switches, wherein the second output terminal operates as an input terminal and receives external data regarding a condition of the lamp when the half-bridge is off. A reset device is connected between the second output terminal and the controller and is operable to provide a fault reset signal to the controller based on the external data and the controller controls the first and second driver circuits based on at least the reset signal A control circuit of a voltage converter circuit that includes a half-bridge with a high side switch and a low side switch connected in series to provide a desired voltage at a node positioned between the high side and low side switches to a load in accordance with an embodiment of the present application includes a first driver circuit operable to provide a first control signal to the high side switch to turn the high side switch on and off with a first output terminal operable to connect the first driver circuit to the high side switch, a second driver circuit operable to provide a second control signal to the low side switch to turn the low side switch on and off with a second output terminal operable to connect the second driver circuit to the low side switch, a controller connected to the first driver circuit and the second driver circuit and operable to control the first and second driver circuits such that the desired voltage is provided at the node between the high side and low side switches, wherein the second output terminal operates as an input terminal and receives external data when the half-bridge is off, an external electrical component connected to the output terminal, a measuring device operable to measure one of an input voltage and current at the output terminal across the electrical component and a parameter setting device operable to set a circuit parameter of the power converter based on the measured value provided by the measuring device and to provide the set circuit parameter to the controller, wherein the external electrical component is one of a resistor, capacitor, inductor and a diode selected to provide a specific voltage at the output terminal.

Other features and advantages of the present invention will become apparent from the following description of the invention which refers to the accompanying drawings.

BRIEF DESCRIPTION OF THE DRAWING(S)

DETAILED DESCRIPTION OF PREFERRED EMBODIMENTS OF THE INVENTION

In the present application, a control circuit, preferably embodied as an integrated circuit and including a standard MOSFET or IGBT gate driver circuit may be provided to control a half-bridge that is used to provide power to a lamp or other load. While the driver circuit is used to provide output control signals to drive one of the switches of the half-bridge, it also serves as an input circuit to realize various sensing functions. Utilizing the gate driver output as an input as well reduces total pin count when the circuit is embodied in an IC. As a result, total package cost is also minimized.

Typically, gate driver circuits are used only as output circuits to turn a MOSFET or IGBT on or off, typically to provide a desired voltage to a lamp or other load. They typically supply a sink and a source current necessary for charging and discharging the gate-to-source capacitance of a MOSFET or IGBT above and below a threshold voltage. The sink and source currents are typically several hundred milliamps to ensure that the MOSFET or IGBT is turned on and off with acceptable switching speeds. These currents are typically supplied by the gate driver circuit using PMOS and NMOS transistors that are sized to supply the desired current without high power losses.

Gate driver circuits are typically connected to the gate of a MOSFET or IGBT through a small gate driver resistor (See RHO, RLO, for example, in FIGS. 1-2) to further optimize the turn on and turn off speeds. Gate driver circuits are typically used only as outputs due to the switching behavior of the control signal they provide and the fixed high and low voltage amplitudes (VCC and COM) for turning the power switch on and off. If the gate drive voltage to the switch is somewhere in between VCC and COM, this can cause the switch to operate in the linear region, and results in high currents and high power losses which would eventually result in destruction of the switch.

Figure 1:
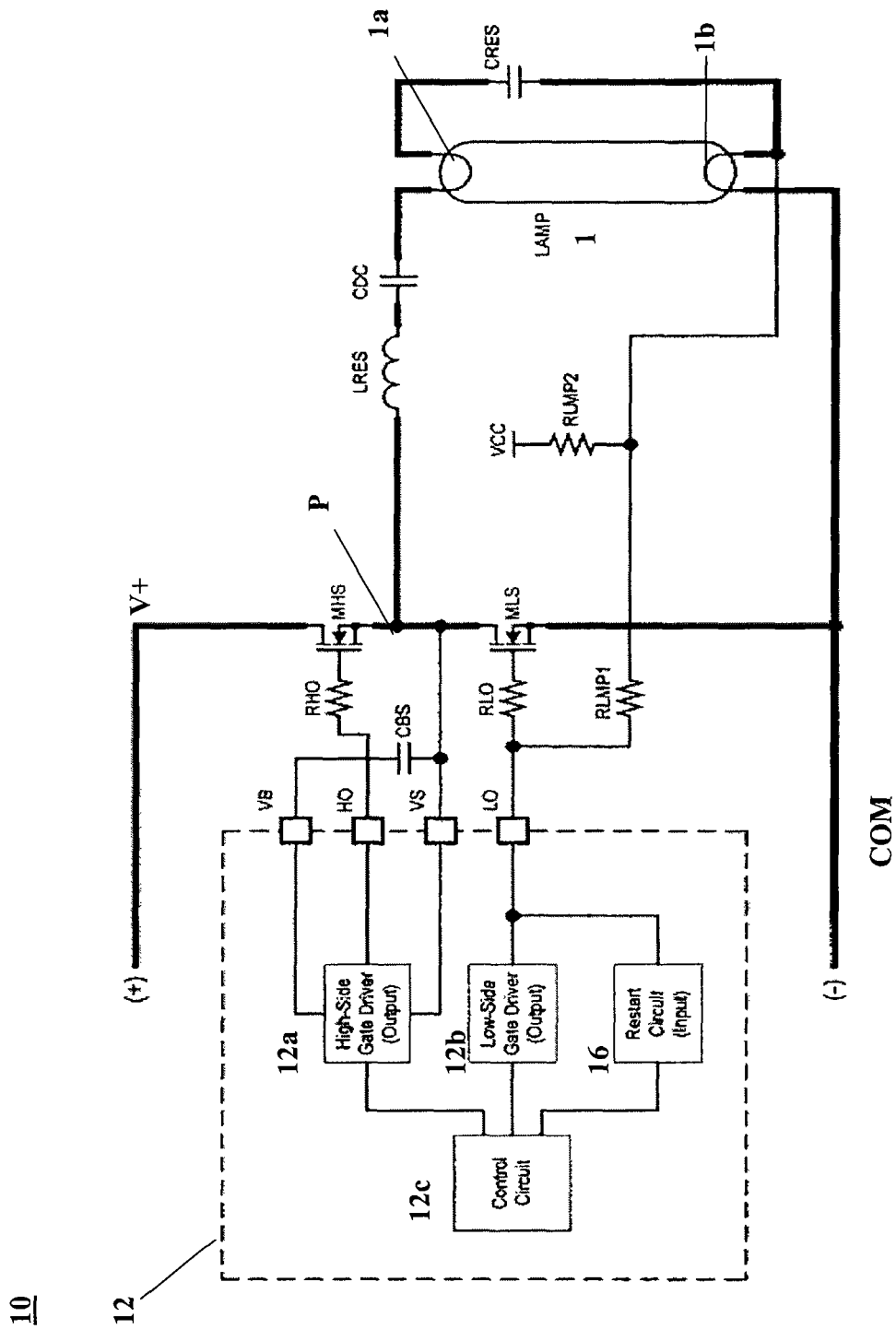
FIG. 1 is an illustration of a control integrated circuit for an electronic ballast utilized to power a fluorescent lamp in accordance with an embodiment of the present application.

FIG. 1 illustrates an electronic ballast circuit 10 including a control circuit 12 in accordance with an embodiment of present application that is used to control a half-bridge 14 formed by the high side switch MHS and the low side switch MLS that provides power to the lamp 1. The switches MHS and MLS are preferably MISFITS as illustrated in FIG. 1, but may be IGBTs if desired. As illustrated, the control circuit 12 is preferably embodied as an integrated circuit (IC) and includes a high side drive circuit 12a that is used to provide an output control signal via the output pin HO to the gate of the high side switch MHS to turn the switch on and off. A low side driver circuit 12b is operable to provide a second control signal as an output signal via the pin LO to the gate of the low side switch MLS to turn this switch on and off. The drivers 12a, 12b are in turn controlled by the controller 12c which controls the drivers to turn the switches MHS, MLS on and off to provide the desired voltage to the lamp 1. The lamp 1 preferably includes an upper filament 1a and a lower filament 1b. The lamp is preferably mounted in a socket (not shown), such that it is electrically connected to the half-bridge 14.

As is noted above, generally, gate driver circuits such as the drivers 12a, 12b of FIG. 1 are used to provide output signals only. However, the control circuit 12 of the present application allows for the input of external information via the contact pins of the driver circuits HO, LO. The control circuit 12 takes advantage of the fact that when the power switches MHS, MLS are connected in the totem pole half-bridge 14 illustrated in FIG. 1, for example, and the ballast or converter is "off", for example, when the electronic ballast is in UVLO mode, Off mode, shutdown mode or standby mode, etc. either the high side switch MHS or the low side switch MLS of the half-bridge 14 can be turned on as long as the other switch is off. Because of the half-bridge configuration, one of the gate driver output pins (HO or LO) can be used to provide an input function. In FIG. 1, the output pin LO of the low side driver circuit 12b is used as an input as well. Thus, in accordance with an embodiment of the present application, during UVLO mode, for example, the high side gate drive output pin HO is held low to keep the high side switch MHS off. The low side gate driver output pin LO becomes an input for realizing a sensing function. That is, the pin LO is used as an input pin to accept external information into the control circuit 12.

The voltage at the low side gate drive output pin LO can be anywhere between VCC and COM. The low side power switch MLS can be turned on and off, operate in the linear region or have any voltage level applied between the gate and source without threat of damage since the high side power switch MHS is off to prevent current flow from the high side supply V+.

Specifically, in FIG. 1, the output pin LO of the low side driver circuit 12b is specifically used as a lamp detection input to sense the removal, or insertion, of the lamp 1 in a lamp socket, for example, to which power is provided from the half-bridge 14. Electronic ballasts which are commonly used to power fluorescent lamps such as the lamp 1, typically utilize a half-bridge circuit such as half-bridge 14 to drive the resonant lamp output stage. In FIG. 1, the control circuit 12 operates as a ballast control circuit and includes the high side gate driver circuit 12a, low side gate driver circuit 12b and the controller 12c that controls the drivers to drive the half-bridge 14 to provide the desired voltage to the lamp 1. As illustrated, the lamp is connected to a node P between the switches MHS, MLS of the half-bridge 14 at which the desired voltage for the lamp is provided.

If the ballast circuit 10 shuts down, for example, due to a fault condition, the high side gate driver 12a turns the high side switch MHS of the half-bridge 14 off. At this time, the low side gate driver output pin LO may be used as an input to the ballast control circuit 12. The input pin LO is preferably connected to the lower lamp filament 1b of the lamp 1 via a resistor network RLMP1, RLMP2. When the lower lamp filament 1b of the lamp 1 is inserted in the socket, that is, when the lamp is present, the resistor network RLMP1, RLMP2 will hold the low side gate driver output pin LO to COM through the lamp filament connection. If the lower lamp filament 1b is removed, the low side gate driver output pin LO will be pulled up through the resistor network to VCC. Thus, the voltage at the pin LO will rise. The pin LO is also connected to reset device 16 of the control circuit 12 which compares the value at pin LO to an internal reset threshold voltage. Once the voltage at the pin LO exceeds the internal reset threshold voltage, the fault condition is reset, but the control circuit 12 keeps the half-bridge 14 off. The fault condition is reset so that the ballast circuit 10 can restart, however, the half-bridge 14 remains off. When a good lamp 1 is inserted into the socket, that is, when the lamp is present, the lower filament 1b will pull the low side gate driver output LO back down to COM again and the voltage at the output pin LO will decrease again below the internal reset threshold voltage. At this time, the low side gate driver output pin LO will be changed internally back into an output and the half-bridge 14 will restart to resume normal operation of the lamp 1. Thus, the low side gate driver output pin LO may be used to drive the low side switch MLS and as an input for a lamp sensing circuit, including reset device 16 in the control circuit 12, which eliminates the need for an additional lamp sensing pin in the integrated control circuit.

Figure 2:
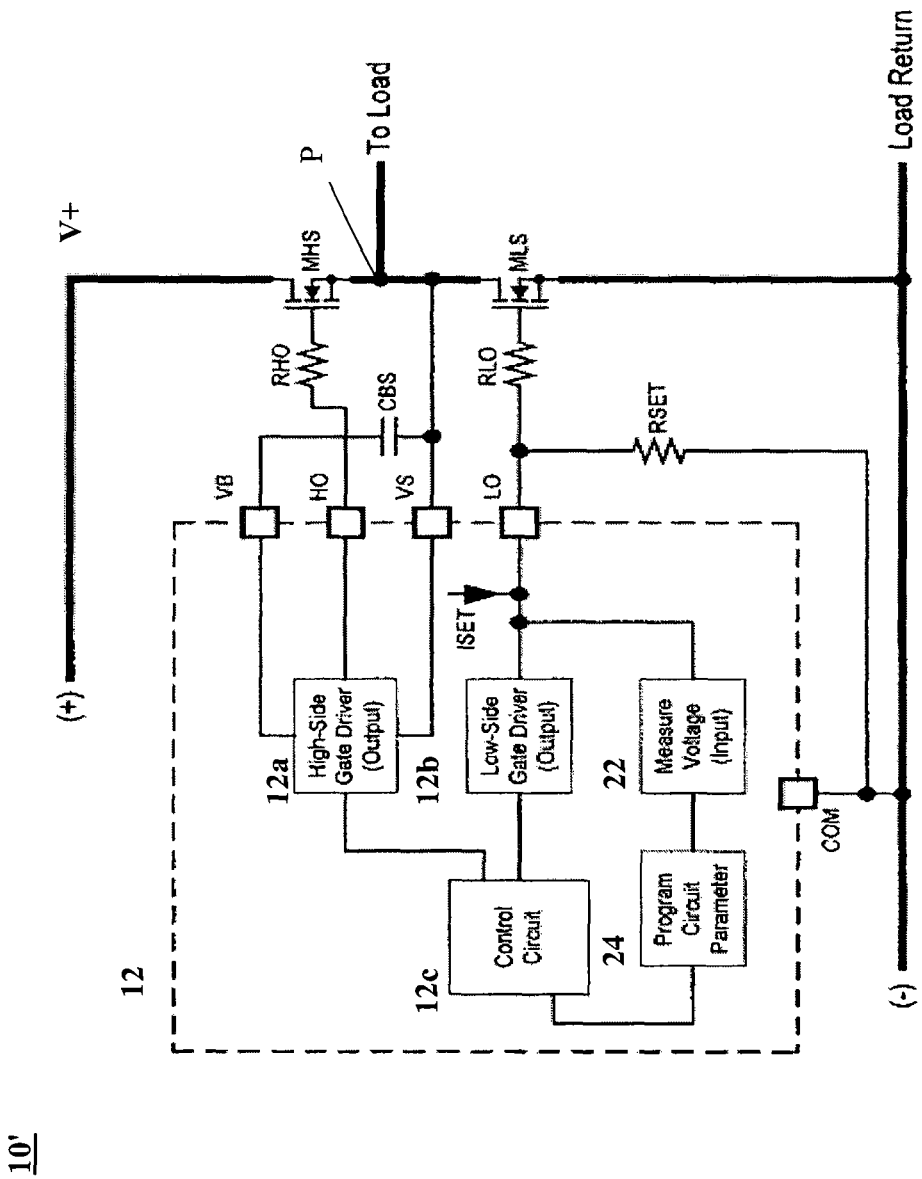
FIG. 2 is an illustration of a control integrated circuit for a voltage converter circuit used to provide power to a load in accordance with an embodiment of the present application.

FIG. 2 illustrates a voltage converter circuit 10' that controls half-bridge 14 to provide a desired voltage to a load (Load). The control circuit 12 is similar to that described above, except that the low side driver output pin LO is used to provide a programming input value. Before normal operation of the half-bridge 14 begins, when it is still off, the low side gate driver output pin LO is provided as an input pin. An internal current source ISET flows out of the low side gate driver output pin LO through a resistor RSET that is connected between the gate driver output pin and the common return line COM. The value of the external resistor RSET is selected such that the voltage at the pin LO is set at a desired level based on the current ISET. The voltage level at the pin LO is then measured at measuring device 22. The measured value is used by a parameter setting device 24 to set a given circuit parameter at a particular value. This set parameter value is then provided to controller 12c. For example, the frequency of the voltage converter 10' may be programmed to a desired value of 100 kHz, for example based on the voltage at the pin LO. After the voltage is measured, and the circuit parameter is set, or programmed, the gate driver output pin LO becomes an output and the half-bridge 14 starts and operates as normal. This allows for elimination of a programming pin in the total pin count.

While FIG. 2 specifically illustrates an internal current source that provides a current through the external resistor RSET and measuring the resulting voltage at the output terminal LO to set the circuit parameter value, the control circuit is not limited to this specific embodiment. For example, an internal voltage source can be provided to apply a voltage across an external resistor connected to the external resistor with the resultant current being measured and used to set the parameter value if desired. Indeed, any means of providing a specific voltage at the pin LO to be measured and set the circuit parameter value may be used. Further any suitable electrical component may be provided at the output terminal LO to provide, for example a resistor, capacitor, inductor or a diode, to provide the specific voltage or current signal to set the desired parameter value.

While the specific embodiments discussed above illustrate the control circuit 12 being utilized in a converter using a half-bridge, it is not necessary to utilize the integrated control circuit 12 in conjunction with a half-bridge. Provided that the switch that is controlled by the driver circuit of the control circuit is not turned on and exposed to high currents, for example in a boost converter, flyback converted etc., the gate driver output pin may be used as an input pin as well. Here the gate driver output pin is used as an input, but the voltage level is preferably limited to a safe level below the turn-on threshold of the switch that is driven by the driver, typically 1 V to prevent the switch from going on. The voltage level can be increased higher, but then the turn-on time and sensing or measuring time should be minimized such that current flowing through the switch does not increase too high and cause the switch to be damaged.

Thus, the present application relates to an integrated control circuit used control a power converter circuit, such as a voltage converter circuit or electronic ballast circuit, in which an output pin of a driver circuit is utilized both as an output and input depending on circuit conditions. As a result, the IC package may be provided with fewer pins and the overall package size can be minimized. In a preferred embodiment, the converter or ballast is utilized in conjunction with a half-bridge and the driver output pin is used as an input pin when the bridge is turned off. The output pin may be used as an input for sensing external values or for programming particular parameter values for the IC.

Utilizing the control circuit of the present application, IC design can be simplified since fewer pins are required and overall package size is also minimized.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A control circuit for a voltage converter including a power switch for providing power to a load, the control circuit comprising:
   a driver circuit operable to provide a first control signal to the power switch to turn the power switch on and off such that a desired voltage is provided to the load;
   an output terminal connected to the driver circuit and operable to connect the driver circuit to the power switch; and
   a controller operable to control the driver circuit, wherein the output terminal is configured to couple the first control signal to a gate of the power switch and operates as an input terminal to receive external data under predetermined conditions, and the controller controls the driver circuit based on the external data, wherein the power switch is configured to be turned on and off, responsive to the external data, independent of the first control signal.

2. The control circuit of claim 1 wherein the output terminal operates as an input terminal when the voltage converter is off.

3. The control circuit of claim 2, wherein the external data includes data related to the load.

4. The control circuit of claim 2, further comprising:
   a second gate driver circuit operable to provide a second control signal to control a second power switch through a second output terminal, wherein the first power switch and second power switch are connected in series in a half-bridge configuration such that the desired voltage is provided at a node between the first and second power switches.

5. The control circuit of claim 4, wherein the controller controls the second power switch to remain off when the output terminal of the first power switch operates as an input terminal.

6. The control circuit of claim 5, further comprising a reset device connected to the output terminal of the first power switch and operable to provide a fault reset signal to the controller based on the external data.

7. The control circuit of claim 6, wherein the fault reset signal indicates a reset of a fault condition to the controller when a voltage value at the output terminal exceeds a predetermined reset threshold voltage and the output terminal is operating as an input terminal.

8. The control circuit of claim 7, wherein a voltage level at the output terminal rises above the predetermined reset threshold voltage when a lamp is not present.

9. The control circuit of claim 4, further comprising:
   an external electrical component connected to the output terminal;
   a measuring device operable to measure one of an input voltage and current at the output terminal across the electrical component; and
   a parameter setting device operable to set a circuit parameter of the power converter based on the measured value provided by the measuring device and to provide the set circuit parameter to the controller, wherein the external electrical component is a resistor selected to provide a specific voltage at the output terminal.

10. The control circuit of claim 1, further comprising a reset device connected to the output terminal and operable to provide a fault reset signal to the controller based on the external data.

11. The control circuit of claim 10, wherein the fault reset signal indicates a reset of a fault condition to the controller when a voltage value at the output terminal exceeds a predetermined reset threshold voltage and the output terminal is operating as an input terminal.

12. The control circuit of claim 1, wherein the external data is programming information related to a circuit parameter of the voltage converter.

13. The control circuit of claim 12, further comprising:
an external electrical component connected to the output terminal;
a measuring device operable to measure one of an input voltage and current at the output terminal across the electrical component; and
a parameter setting device operable to set a circuit parameter of the power converter based on the measured value provided by the measuring device and to provide the set circuit parameter to the controller.

14. The control circuit of claim 13, wherein the external electrical component is a resistor selected to provide a specific voltage at the output terminal.

15. The control circuit of claim 1, wherein the load is a fluorescent lamp.

16. The control circuit of claim 1, wherein the external data is related to a lamp condition.

17. The control circuit of claim 16, wherein the external data indicates whether a lamp is present.

18. The control circuit of claim 1, wherein the control circuit is implemented as an integrated circuit and the output terminal is embodied as a single pin of the integrated circuit.

19. A control circuit of an electronic ballast circuit that includes a half-bridge with a high side switch and a low side switch connected in series to provide a desired voltage at a node positioned between the high side and low side switches to a lamp, the control circuit comprising:
a first driver circuit operable to provide a first control signal to the high side switch to turn the high side switch on and off with a first output terminal operable, to connect the first driver circuit to the high side switch;
a second driver circuit operable to provide a second control signal to the low side switch to turn the low side switch on and off with a second output terminal operable to connect the second driver circuit to the low side switch;
a controller connected to the first driver circuit and the second driver circuit and operable to connect the first and second driver circuits such that the desired voltage is provided at the node between the high side and low side switches; wherein
the second output terminal operates as an input terminal and receives external data regarding a condition of the lamp when the half-bridge is off; and
a reset device connected between the second output terminal and the controller and operable to provide a fault reset signal to the controller based on the external data and the controller controls the first and second driver circuits based on at least the reset signal.

20. A control circuit of a voltage converter circuit that includes a half-bridge with a high side switch and a low side switch connected in series to provide a desired voltage at a node positioned between the high side and low side switches to a load, the control circuit comprising:
a first driver circuit operable to provide a first control signal to the high side switch to turn the high side switch on and off with a first output terminal operable to connect the first driver circuit to the high side switch;
a second driver circuit operable to provide a second control signal to the low side switch to turn the low side switch on and off with a second output terminal operable to connect the second driver circuit to the low side switch;
a controller connected to the first driver circuit and the second driver circuit and operable to control the first and second driver circuits such that the desired voltage is provided at the node between the high side and low side switches; wherein the second output terminal operates as an input terminal and receives external data when the half-bridge is off;
an external electrical component connected to the output terminal;
a measuring device operable to measure one of an input voltage and current at the output terminal across the electrical component; and
a parameter setting device operable to set a circuit parameter of the power converter based on the measured value provided by the measuring device and to provide the set circuit parameter to the controller, wherein the external electrical component is a resistor selected to provide a specific voltage at the output terminal.

* * * * *